Dec. 9, 1941.         R. W. LUCE                2,265,661
             THREADED LOCKING DEVICE
                Filed Aug. 4, 1939
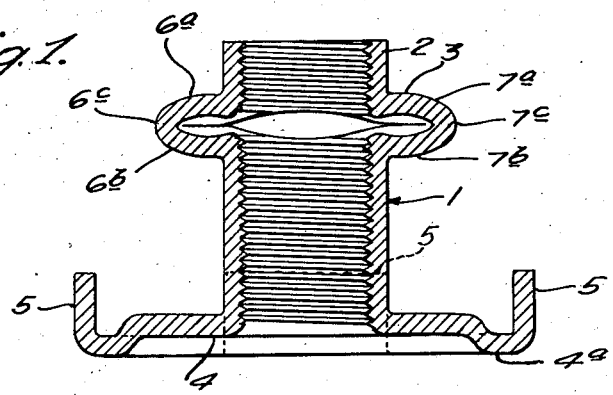
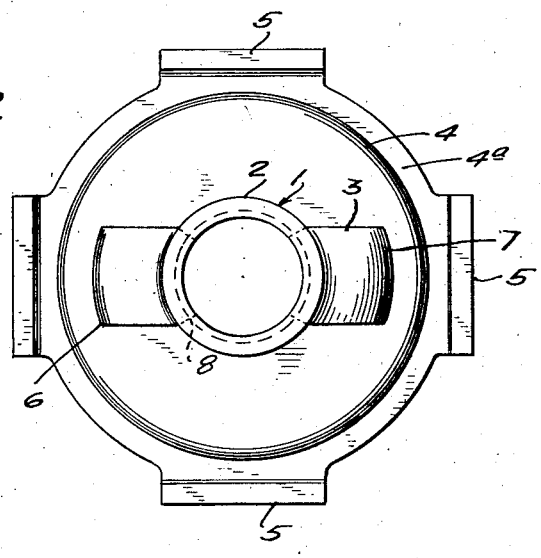
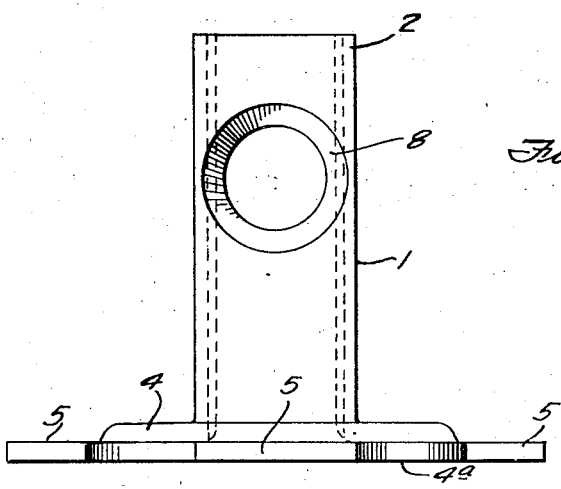
INVENTOR
RICHARD W. LUCE
BY
George T. Gill
ATTORNEY Patented Dec. 9, 1941

2,265,661

UNITED STATES PATENT OFFICE 2,265,661

THREADED LOCKING DEVICE

Richard W. Luce, Southport, Conn.

Application August 4, 1939, Serial No. 288,266

3 Claims. (Cl. 151—21)

The invention herein disclosed relates to a threaded locking-device of the type in which the locking action is effected by a force exerted axially and acting to maintain the surfaces of the thread of the locking-device and a thread of the bolt entered therein frictional engagement.

The threaded locking-devices of this class that have gone into use are of two forms. One form is that in which a resilient fibrous medium is used to provide the necessary axial force between the threads of the locking-device and the threads of a bolt or screw entered therein. In the other form, there is provided two axially spaced threaded portions having a thread of the same pitch and a resilient portion between the threaded portions normally holding the threaded portions with the threads thereof out of phase.

Since one of the functions of such threaded locking-devices is to remain secure under the action of force resulting from vibration, it is important that the weight of the locking-device be as small as possible. The moment of inertia of such a device is proportional to the mass of the device and in consequence any reduction in the mass of the device lessens the force tending to rotate the locking-device relative to the screw. A reduction in the weight of such devices is also important where such devices are used in airplane construction, as any reduction in the weight of the constructional elements of an airplane increases the load-carrying capacity accordingly.

By the invention herein disclosed there is provided, a threaded locking-device of the type mentioned which has a relatively thin wall section. The threaded locking-device of this invention is preferably stamped from sheet metal and has a relatively thin, substantially uniform wall thickness throughout. The weight of the locking-device and its moment of inertia are thus materially reduced without affecting its efficacy as a locking-device or its holding power.

Two such locking-devices, embodying the invention, are illustrated in the accompanying drawing in which:

Fig. 1 is a longitudinal section of a lock-nut;

Fig. 2 is a plan of the same; and

Fig. 3 is an elevation of a blank from which the nut illustrated in Fig. 1 is made.

In the lock-nut illustrated in the drawing, there is what may be termed a body portion that has a load-carrying thread therein and a medium associated with the body portion for exerting an axially resilient force, between the body portion and a screw or bolt entered therein, to effect frictional engagement of the surface of the thread of the body portion and the surface of the thread of the bolt. In the nut illustrated, the medium for exerting the resilient force consists of a metallic spring element.

The nut illustrated in the drawing includes an internally threaded body portion 1 having the load-carrying thread therein, another threaded portion 2 axially spaced from the body portion 1 and a resilient portion 3 intermediate the tapped body portion 1 and the smaller tapped portion 2. The two tapped portions 1 and 2 have a thread of the same pitch. The resilient portion 3 normally holds the tapped portions with the threads thereof out of phase.

Extending from one end of the body portion 1 there is a flange 4 that extends substantially at right angles to the axis of the nut. This flange is dish-shaped as shown having a circumferential, axially displaced annulus 4a. The flange forms the face of the nut. Extending from the flange are four extensions 5 which extend parallel to the axis of the nut and form wrench engaging surfaces.

The resilient portion 3 consists of a pair of diametrically opposite wings 6 and 7 that extend substantially radially outwardly of the nut. The wing 6 includes two outwardly extending axially spaced substantially radially wall sections 6a and 6b. These wall sections are united at their outer ends by an arcuate, curved wall section 6c. The wall sections 6a is united at its inner end to the end of the tapped portion 2 and the wall section 6b is united at its inner end to the adjacent end of the tapped portion 1. The wing 7 consisting of similar wall sections 7a, 7b, and 7c similarly arranged.

In making the nut described above a cup-shaped blank, such as that illustrated in Fig. 3, is drawn from sheet metal. The blank is drawn and shaped to provide the flange 4 and the extensions 5 which, in the blank, extend radially of the axis of the cylindrical portion of the blank.

The end of the blank is pierced and at diametrically opposite sides it is scarfed as at 8. The blank is then compressed axially to form the wings 6 and 7. Next the blank is tapped, after the wings 6 and 7 have been formed so that the tap does not cut into this portion of the nut. The tap is run through both the body portion, and the smaller tapped portion 2. After this tapping, the nut is again compressed axially, this compression being controlled so that the threads of the two tapped portions are out of phase in the finished nut. The extensions 5 are bent to extend parallel to the axis of the nut.

From the foregoing, it will be seen that when a bolt is entered in the nut it engages the threads of the tapped body portion 1 and passes through the resilient portion 3. On entering the tapped body 2, the tapped portion 2 must be moved axially with respect to the tapped portion 1 until the threads of the tapped portion 2 come into phase with the threads of the bolt. This movement takes place as a bending action of the wings 6 and 7, the bendng action being well within the elastic limit of the metal. The resiliency of the wings 6 and 7 causes the surface of the thread of the body portion of the nut to be drawn into intimate and frictional contact with the surface of the thread of the bolt entered therein. The frictional force thus effected is sufficient to hold the nut against relative movement with respect to the bolt under the action of forces acting thereon and resulting from vibration.

The flange 4 is dish-shaped as shown to provide a certain amount of resiliency in the flange. When the nut is used to secure two parts together, as for example two plates, the flange 4 acts in the nature of a lock washer to take up any looseness that might occur by virtue of corrosion of the surface against which the nut abuts. It is also to be noted that if the face of the nut be not exactly perpendicular to the thread axis of the nut, the face of the nut will not ride on or engage on one portion only, as is the case with the ordinary nut, when it is drawn home. The resiliency of the flange permits the flange to adjust itself to any inaccuracy in alignment so that the full face of the nut engages the surface against which the nut is drawn home.

From the foregoing description of the embodiment of the invention illustrated in the drawing, it will be seen that by this invention there is provided a threaded locking-device that is substantially tubular and has a portion having a load-carrying thread and a portion for exerting an axial force to effect a frictional engagement between the surface of the load-carrying thread and the surface of the thread of a bolt entered therein. The resilient portion is of larger diameter than the threaded portion and the force exerted is the result of a bending action of the resilient medium. The nut has a relatively thin wall section and the wall of the nut is of substantially uniform thickness throughout. The strength of the thread in shear and consequently their holding power may be materially increased by heat treating. Heat treating also substantially enhances the effect of the resilient portion of the nut.

It will be obvious that various changes may be made by those skilled in the art in the details of the embodiments of the invention illustrated in the drawing and described above within the principle and scope of the invention as expressed in the appended claims.

I claim:

1. A sheet metal threaded locking device of the kind described comprising several, integral portions of substantially uniform and relatively thin wall sections, the several portions including two axially spaced, internally threaded portions, and a resilient portion between the threaded portions normaly holding the threaded portions with the threads thereof out of phase, the resilient portion including several resilient sections symmetrically disposed about the axis of the locking device, each resilient section comprising substantially radial wall sections united at their outer end and arranged to partake of bending action upon relative axial movement of the threaded portions.

2. A threaded locking device of the kind described comprising in combination several portions, the several portions including two axially spaced, internally threaded portions, and a resilient portion between and united to the threaded portions normally holding the threaded portions with the thread thereof out of phase, the resilient portion including several resilient sections symmetrically disposed about the axis of the locking device, each resilient section united to both threaded portions and comprising substantially radial wall sections united at their outer ends and arranged to partake of a bending action upon relative axial movement of the threaded portions.

3. A sheet metal threaded locking device of the kind described comprising in combination several integral portions of substantially uniform and relatively thin wall sections, the several portions including two axially spaced, internally threaded portions and a resilient portion between the threaded portions with the threads thereof out of phase, the resilient portion including several substantially radial outwardly extending resilient sections symmetrically disposed about the axis of the device, each resilient section being united to both threaded portions and comprising two substantially radial wall sections united at their outer ends and the resilient sections being arranged to partake of a bending action upon relative axial movement of the threaded portions.

RICHARD W. LUCE.